United States Patent [19]
Maeda et al.

[11] 3,905,492
[45] Sept. 16, 1975

[54] MULTI-RACK STACKER SYSTEM WITH A CONVEYOR AND TRANSVERSER

[75] Inventors: Kazuo Maeda; Masakatsu Tsubokawa, both of Yokohama, Japan

[73] Assignee: Kabushiki Kaisha Kito, Kawasaki, Japan

[22] Filed: June 29, 1973

[21] Appl. No.: 374,843

[30] Foreign Application Priority Data

| July 1, 1972 | Japan | 47-65409 |
| July 3, 1972 | Japan | 47-65884 |
| July 4, 1972 | Japan | 47-66314 |

[52] U.S. Cl. ............. 214/16.4 B; 104/48; 211/176
[51] Int. Cl. ............................................. B65g 1/06
[58] Field of Search ............. 214/16.4 A, 16.4 B; 104/48, 123; 211/176

[56] References Cited
UNITED STATES PATENTS

| 2,919,657 | 1/1960 | Wack | 104/48 |
| 3,174,634 | 3/1965 | Peck | 214/16.4 A |
| 3,583,583 | 6/1971 | Martin | 214/16.4 B |
| 3,593,823 | 7/1971 | Thompson | 214/16.4 B |
| 3,638,575 | 2/1972 | Griner | 214/16.4 A |
| 3,670,905 | 6/1972 | Burch et al. | 214/16.4 A |

*Primary Examiner*—Frank E. Werner
*Assistant Examiner*—R. B. Johnson
*Attorney, Agent, or Firm*—Sughrue, Rothwell, Mion, Zinn and Macpeak

[57] ABSTRACT

A traverser for multi-rack stacker system normally supports an accumulation conveyor on accumulation conveyor supporting rails fixed to the inside of legs of a U-shaped body of the traverser and is adapted to be traversely moved along the ends of a number of stacker shelves of the system which extend in parallel and have accumulation conveyor paths therebetween. The accumulation conveyor supporting rails are at the same level and spaced apart from each other the same distance as those of accumulation conveyor traveling rails located on the accumulation conveyor paths, thereby the accumulation conveyor is adapted to move from the traverser onto the paths when the traverser is in opposition to the path and adapted to travel on the path to the position in opposition to a desired shelf to load or unload stocks onto or from the shelf.

7 Claims, 13 Drawing Figures

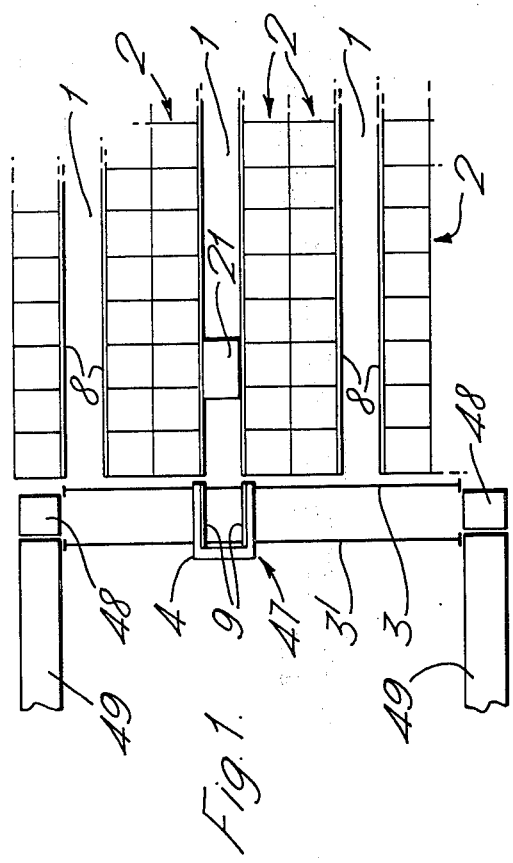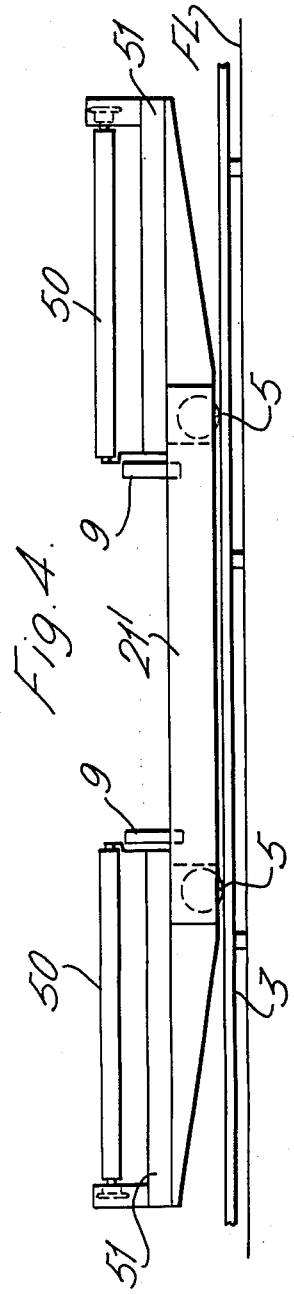

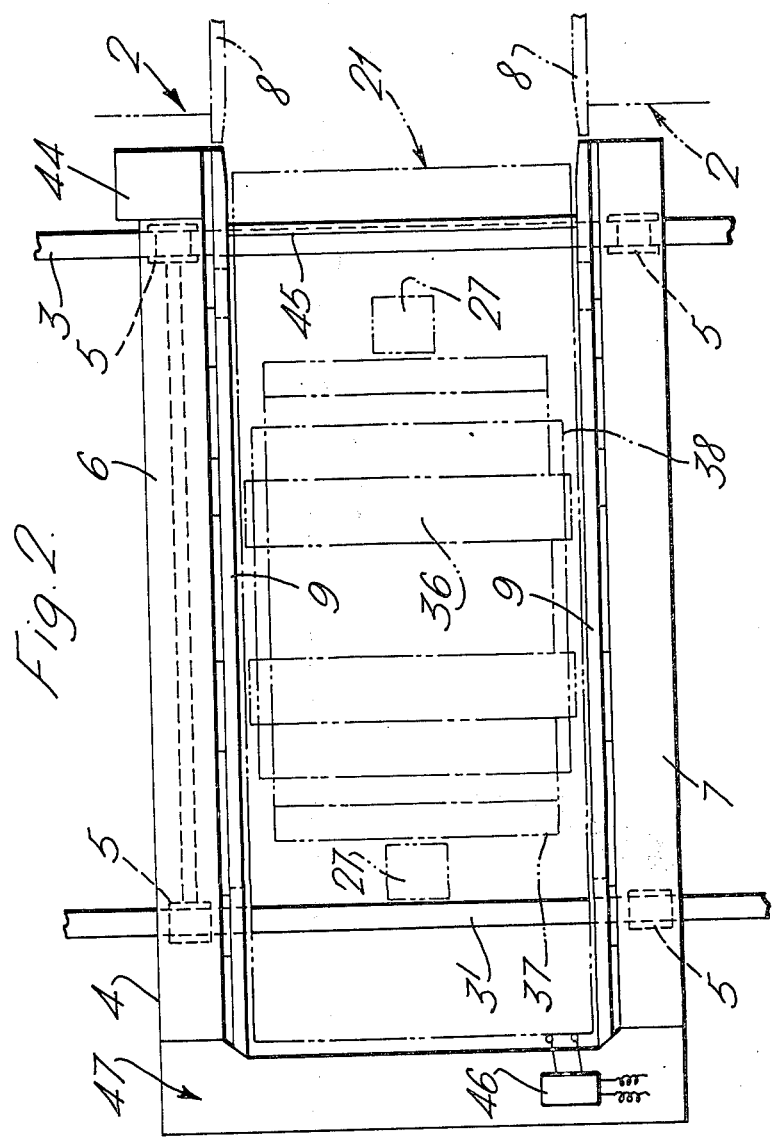

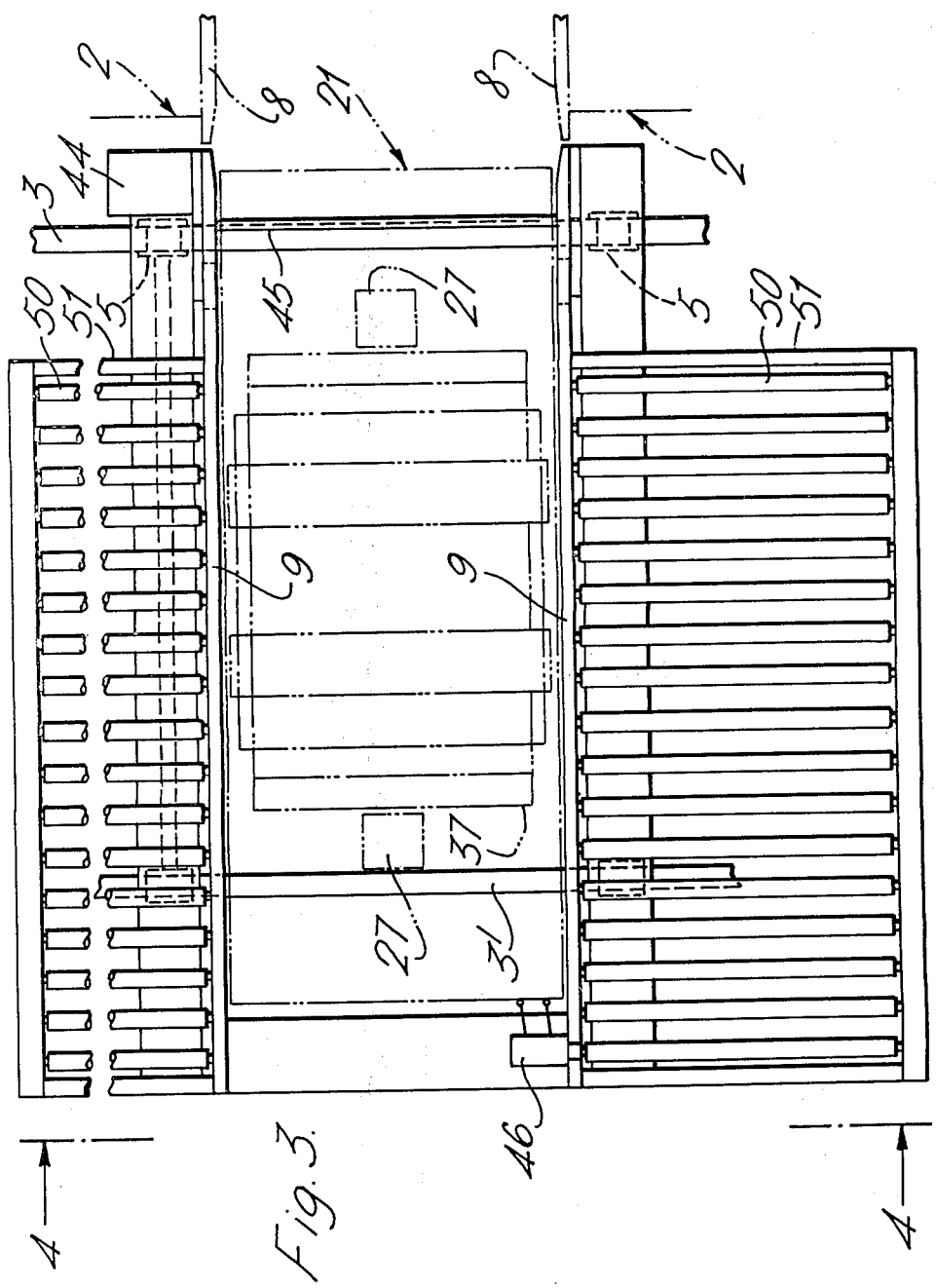

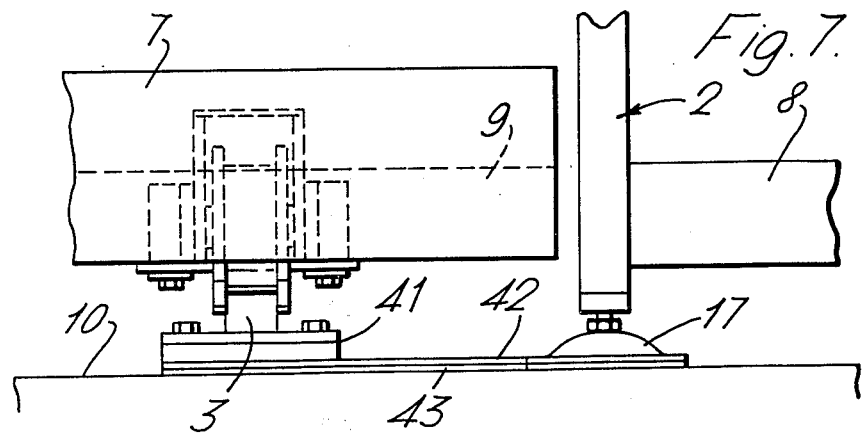
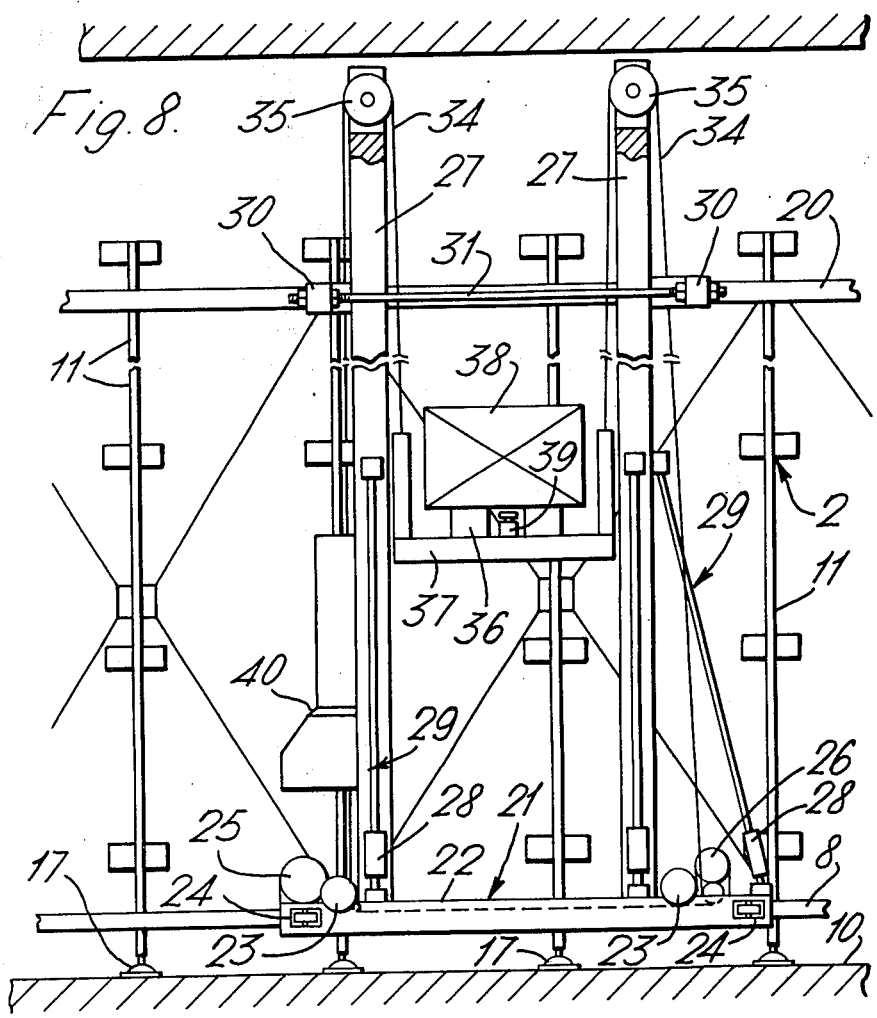

MULTI-RACK STACKER SYSTEM WITH A CONVEYOR AND TRANSVERSER

BACKGROUND OF THE INVENTION

1. Field of the Invention

This invention relates to a traverser for a multi-rack stacker system, which travels along the ends of a number of multi-rack stacker shelves arranged in rows parallel with each other in a building such as a warehouse, factory or the like for carrying stocks in or out of the shelves of the system.

2. Description of the Prior Art

In such kind of the system, accumulation conveyor traveling rails are arranged on both sides of accumulation conveyor paths between spaced and parallel multi-rack stacker shelves, on which rails is mounted an accumulation conveyor of which vertical frame is provided with a liftable carriage having extensible and retractable forks.

With such a construction of the prior art, if a traverser main body is constructionally weak, it may be unable to securely support a carriage and vertical frames extending upwardly from the main body and therefore the stability of the whole traverser decreases which adversely affects the operation of the accumulation conveyor and various kinds of detecting devices therefor.

To obtain sufficient rigidity of the traverser if the traverser main body were larger in size, the traverser itself would become larger and conveyor paths would become necessarily wider so that the system may require a considerably large floor space.

In the prior art, moreover, the upper ends of the vertical frame are connected with each other by upper cross frames which limit the lift of stocks so that the stocks cannot be lifted to the proximity of the ceiling of a building for loading and unloading, and therefore the uppermost space in the building cannot be effectively utilized. Furthermore, the presence of the upper cross frames results in high center of gravity of the accumulation conveyor to decrease the stability of the conveyor.

SUMMARY OF THE INVENTION

The invention is intended to overcome the above disadvantages in the prior art and for its purpose the traverser according to the invention comprises an accumulation conveyor, traverser traveling rails arranged in a traverse direction along the ends of the shelves, a traverser body formed in a V-shaped frame in a horizontal plane opening towards said conveyor path, said body having wheels on said rails, accumulation conveyor supporting rails fixed to the inside of the front and rear members which are legs of said V-shaped frame, and accumulation conveyor traveling rails located on both sides of said accumulation conveyor paths, said accumulation conveyor supporting rails being at the same level and spaced apart from each other the same distance as those of accumulation conveyor traveling rails located on both sides of said accumulation conveyor paths.

In another aspect, the invention provides a traverser for a stacker system, wherein said accumulation conveyor traveling on said accumulation conveyor supporting rails comprises a carriage raising and lowering along a vertical frame consisting of vertical members upstandingly fixed on both sides to a lower frame of said accumulation conveyor, the upper ends of said vertical members of the vertical frame being opened without being connected with each other.

In further aspect, the invention provides a traverser for a stacker system, wherein said accumulation conveyor traveling on said accumulation conveyor supporting rails comprises a carriage raising and lowering along a vertical frame consisting of vertical members upstandingly fixed on both sides to a lower frame of said accumulation conveyor, the upper ends of said vertical members of the vertical frame being opened without being connected with each other and the upper ends of said vertical members of said vertical frame extending upwardly beyond the uppermost surface of said shelves to enable the shelves to accommodate stocks on said uppermost surface.

An object of the invention is to provide an improved traverser for a multi-rack stacker system having a main body of a simple but high rigidity construction and capable of supporting an accumulation conveyor in a lower position to improve the stability of the traverser.

Another object of the invention is to provide an improved traverser having an accumulation conveyor capable of raising stocks to the level of the upper end of a vertical frame of the conveyor for loading the stocks on the shelves whereby enabling the space in a building to be fully utilized, enabling the shelves to be inexpensive to manufacture and improving the stability of the system.

The foregoing objects and other objects as well as the characteristic features of the invention will become more apparent and more readily understandable by the following description and the appended claims when read in conjunction with accompanying drawings.

BRIEF DESCRIPTION OF THE DRAWINGS

FIG. 1 is a diagrammatical plan view of a stacker system incorporating a traverser according to the invention;

FIG. 2 is a plan view of the traverser according to the invention;

FIG. 3 is a plan view of another embodiment of the traverser having roller conveyors on both sides;

FIG. 4 is a side view of the traverser shown in FIG. 3;

FIG. 7 is an explanatory view showing the connection between a traverser traveling rail and multi-rack stacker shelves;

FIG. 8 is an elevation showing the relation between an accumulation conveyor and the stacker shelves;

DESCRIPTION OF THE PREFERRED EMBODIMENTS

Figure 12:
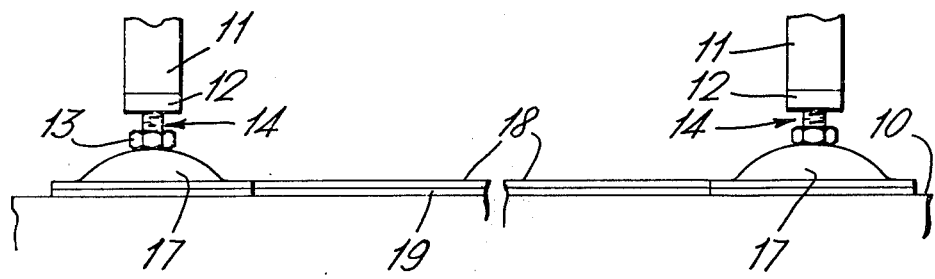
FIG. 12 is a side view showing the connection between front support members of the shelves.
Figure 13:
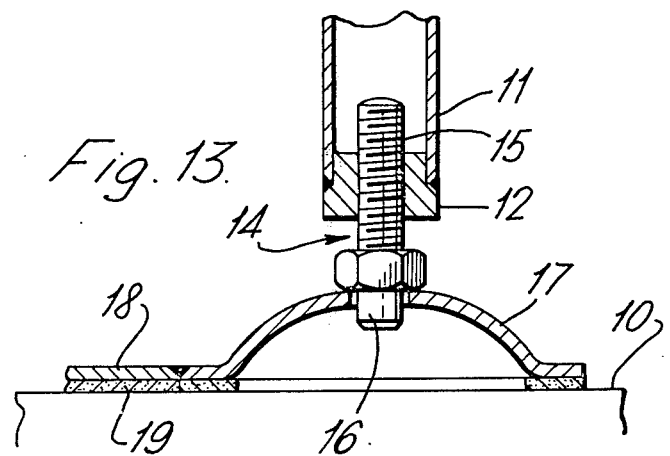
FIG. 13 is an enlarged sectional view of the part of the connection shown in FIG. 12.

Referring to FIGS. 1 to 13, particularly FIG. 1, there is shown a multi-rack stacker system employing a preferred embodiment of the traverser according to the invention, the stacker system having a plurality of sets of multi-rack stacker shelves 2 extending on a floor 10 in parallel with each other and interposing accumulation conveyor paths 1 therebetween. Front support members 11 each facing the conveyor path 1 and rear support members 11' not facing the conveyor path 1 (FIG. 9) are provided at their lower ends with female screw threaded fitting 12 fixed thereto, respectively, each of which threadably receives a male threaded rod 15 of height adjusting means 14 having a nut 13 adapted to be rotated by a wrench or the like rotary tool (FIGS. 12 and 13). The lower end 16 of the rod 15 of the height adjusting means 14 passes through a through aperture of a base member 17. The member 17 associated with the front support member 11 is connected to the end of a connecting plate 18 made of metal band strip adjacent to the floor surface for maintaining constant the interval between the stacker shelves arranged on both sides of the conveyor path 1. A buffer plate 19 is fixed to the bottom surface of the base member 17 and connecting plate 18, which is made of steel plate or elastic material such as rubber and serves to improve the stability and to prevent the slip of the base member on the floor to ensure that the distance between the shelves 2 is kept constant. The front and rear support members 11, 11' of the stacker shelves 2 are connected at their upper portions by cross beams 20 and the front support members 11 are provided at their front lower portions with rails 8 fixed thereto with as bolts for traveling of an accumulation conveyor.

Figure 5:
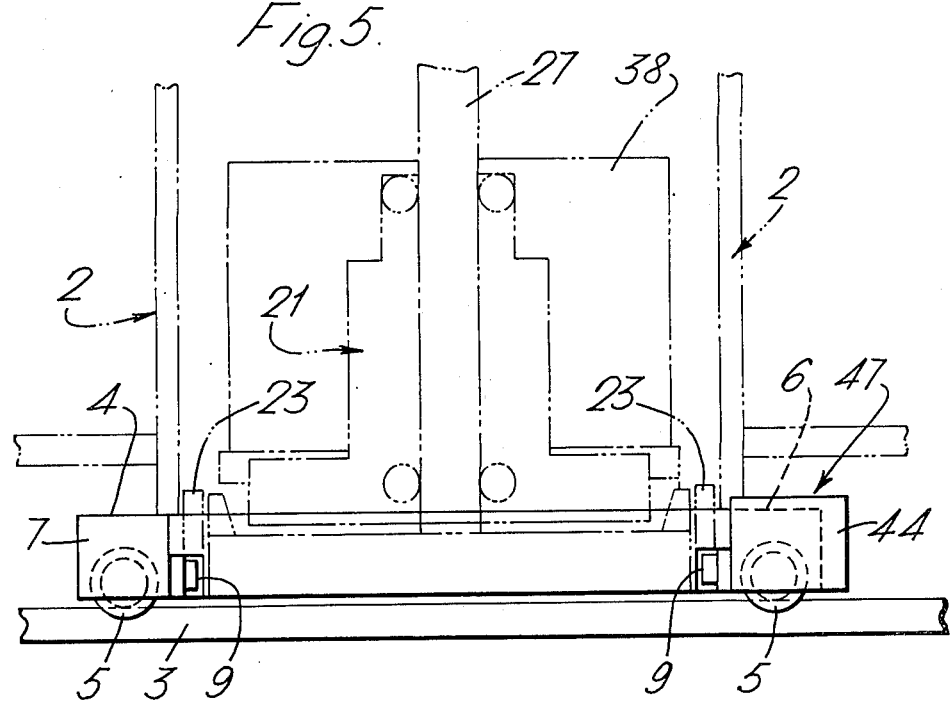
FIG. 5 is a side view of the traverser shown in FIG. 2.
Figure 6:
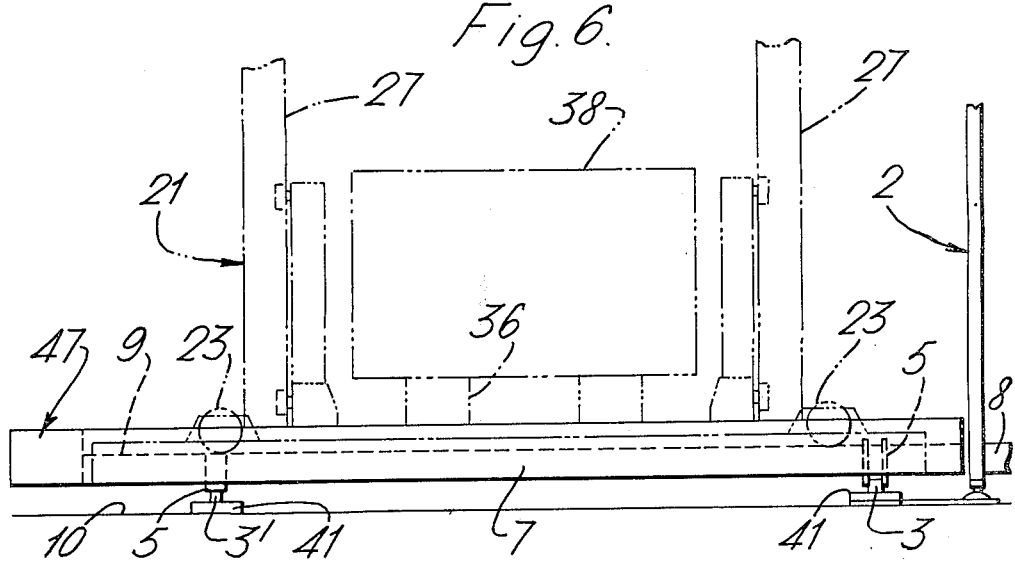
FIG. 6 is a front elevation of the traverser shown in FIG. 2.
Figure 9:
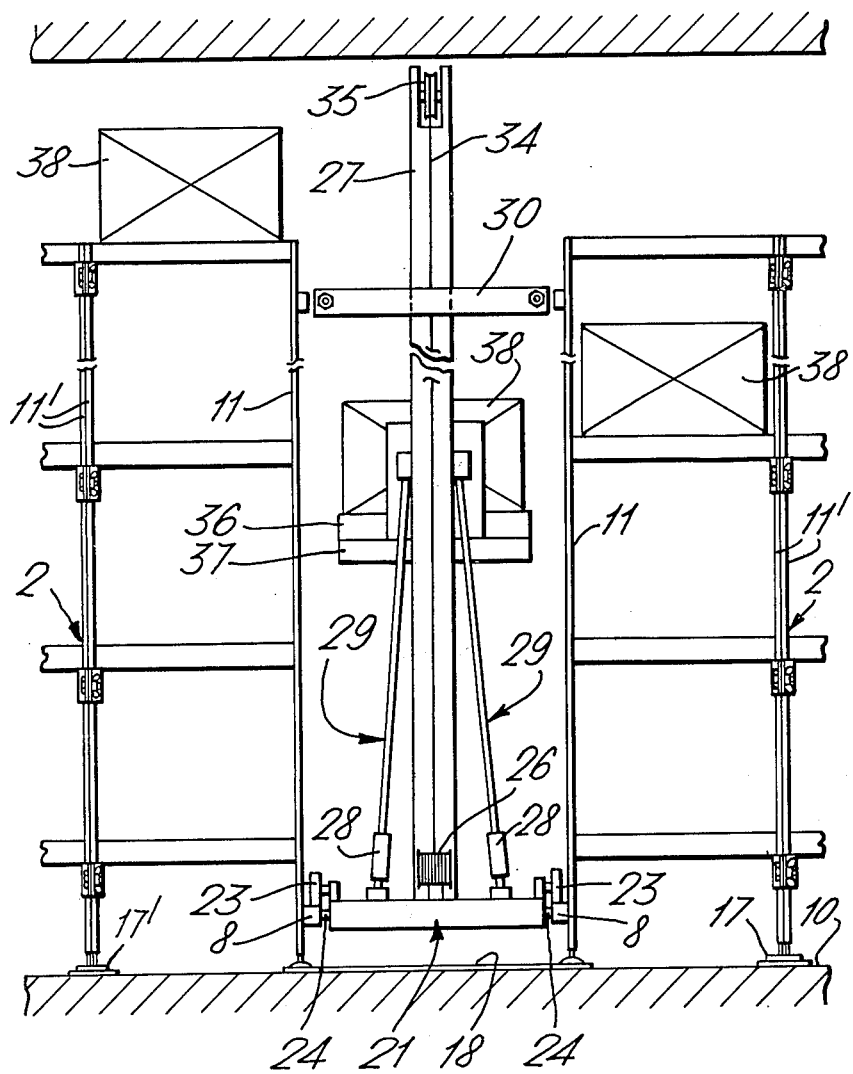
FIG. 9 is a side view of the conveyor and shelves shown in FIG. 8.
Figure 10:
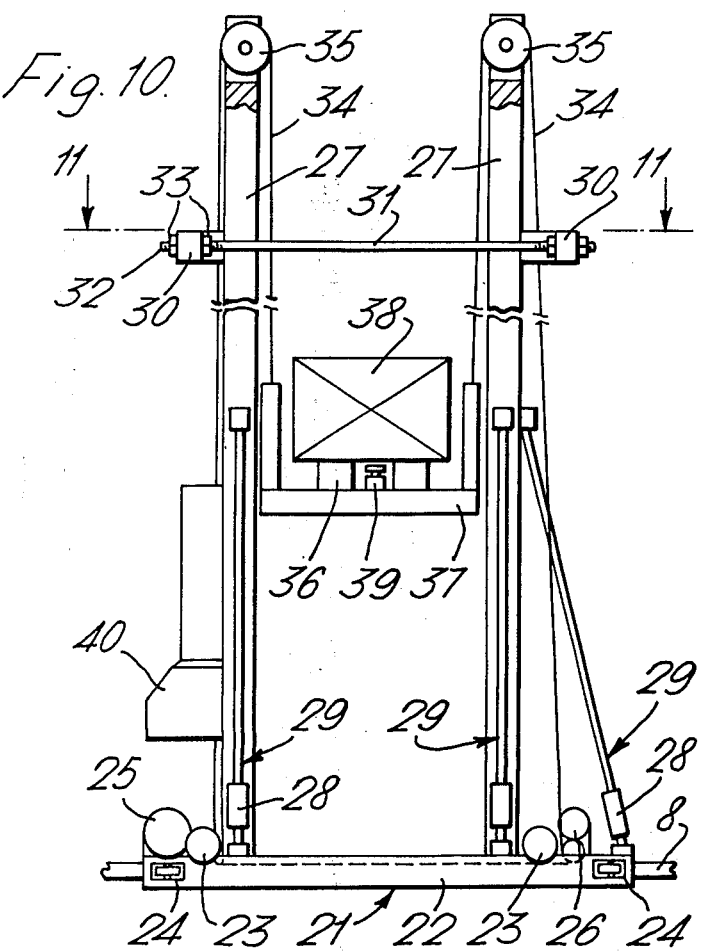
FIG. 10 is a front elevation of the accumulation conveyor.
Figure 11:
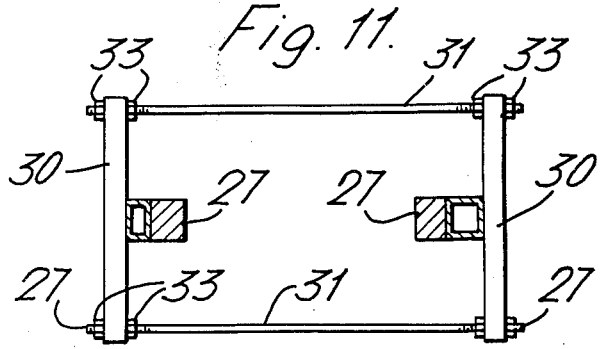
FIG. 11 is a sectional view taken along the line A-A in FIG. 10.

Referring to FIGS. 8 and 9, a lower frame 22 of the self-standing travel accumulation conveyor 21 comprises front and rear wheels 23 on both sides thereof rolling on the upper surfaces of the rails 8, guide rollers 24 engaging the sides of the rails 8, a travel drive means 25 and a winch 26 fixed to the lower frames. A vertical frame 27 consisting of two vertical members has a lower portion fixed to the lengthwise ends of the lower frame 22 and an upper portion completely opening without being connected by any upper horizontal frame and extending higher than the level of the uppermost surface of the multi-rack stacker shelves 2 to make it possible to load stocks on the uppermost surface of the shelves. The mid portion of each vertical member of the frame 27 is connected to the lower frame 22 by an oblique stay member 29 having a turnbuckle 28 for adjusting the length of the member 29.

Cross frame members 30 are fixed at their mid portions to the upper parts of the vertical frame 27 at the same level as that of the cross beams 20. The cross frame members 30 are formed at their ends with apertures for receiving male screw portions 32 formed at the ends of spacer rods 31 so that the ends of the cross frame members 30 and the spacer rods 31 are fixed with each other by means of nuts 33 threadedly engaged with the male screw portions 32 to ensure a constant distance between the vertical members of the frame 27.

Two ropes 34 taken up from the winch 26 extend over pulleys 35 located on the upper ends of the vertical frame 27 and are connected at their ends to the ends of a carriage 37 having extensible and retractable forks 36 and stock detecting means 39 for detecting stocks on the carriage. A control panel 40 is mounted on one of the vertical members of the frame 27 for controlling the traveling of the accumulation conveyor 21, the lifting of the carriage 37, the extension and retraction of the forks 36 and the actuation of the stock detecting means 39.

As shown in FIG. 9, the rear support members 11' may be clamped in back to back relationship by means of fastening bands and bolts and wing nuts, so that the shelves can be treated as units. In this case, a base member 17' is formed with two close through apertures in registry with the lower ends 16 of the rods 15 of the rear support members 11' in contact with each other. The base member 17' may be flat as shown.

In the above embodiment, the rails 8 are fixed to the front support members 11 facing the associated conveyor path 1. As an alternative, the rails 8 may be arranged on the connecting plates 18 and securely fixed thereto by means of bolts and the like.

Rails 3 and 3' are traversely arranged at the ends of the multi-rack stacker shelves for traveling of the traverser and the rail 3 in the vicinity of the ends of the shelves is fixed on the floor by means of a base 41 which is connected to the base members 17 at the ends of the multi-rack stacker shelves 2 by connecting plates 42 of metal strip in contact with the floor, to the bottom surface of which plates 42 are fixed buffer plates 43 which are made of steel plate or elastic material such as rubber and serve to improve the stability and to prevent the slip of the connecting plates 42 on the floor to ensure that the distance between the ends of the shelves 2 and the rail 3 is kept constant.

A main body 4 of the traverser is made in U-shaped form in a horizontal plane opening towards the conveyor path 1 and comprises wheels 5 supported on the traverser traveling rails 3, 3' and drive means 44 for driving the wheels 5 on the side of the main body which is provided with the drive means. The front and rear frames 6 and 7 of the main body 4 are provided on their inside with rails 9 fixed thereto for supporting the accumulation conveyor arranged at the same level as that of the rails 8 for traveling of the accumulation conveyor and spaced apart from each other the same distance as that of the rails 8 and the ends of the front and rear frames are connected with each other by a reinforcing connecting rod 45 (FIG. 2).

A control switch 46 is fixed to the main body of the traverser, which is actuated by the accumulation conveyor 21 to allow the traverser 47 to travel only when the accumulation conveyor 21 is located in position on the traverser 47 and allow the accumulation conveyor 21 to travel only when the traverser 47 is stopped.

Referring to FIG. 1, at the ends of the rails 3, 3' there are provided with stations 48 as starting points for carrying in and out the stocks 38, each station 48 is provided with a conveyor 49 adjacent thereto for conveying the stocks 38.

In a preferred embodiment of the invention, referring to FIGS. 3 and 4 the main body 4 of the traverser is provided along substantially entire length of the frames 6, 7 or the legs of the U-shaped frame with roller conveyors in parallel with the rails 9, each of which comprises a number of elongated rollers 50 and a support 51 carrying the rollers 50 on either side of the main body 4.

In this manner, the roller conveyors on both sides of the traverser main body make it possible to dispense with the stations 48 to operatively connect the traverser to the conveyor 49 directly (FIG. 1).

The stacker system incorporating the traverser according to the invention operates as follows.

In carrying stocks in the system, the control panel 40 in the accumulation conveyor 21 on the traverser 47 adjacent to the station is energized to produce a carrying-in information, causing the traverser having the accumulation conveyor 21 mounted thereon to travel until it stops in position in opposition to the conveyor path 1 for the desired shelves. Then the accumulation conveyor moves out of the traverser 47 and continues moving on the conveyor path 1 until it stops in position in opposition to the desired shelves. After the stoppage of the accumulation conveyor the carriage 37 moves vertically to a desired level and stops thereat, after which the extensible and retractable forks 36 extend to load the stocks 38 onto the desired shelf. After the forks 36 have retracted, the accumulation conveyor 21 returns onto the rails 9 on the traverser 47 and then the traverser 47 returns to the proximity of the station 48.

In carrying stocks out of the system, the control panel 40 in the accumulation conveyor is energized to produce a carrying-out information, causing the traverser to travel in the same manner as in case of carrying-in until it stops in position in opposition to the conveyor path 1 for the desired shelves, after which the accumulation conveyor 21 moves to and stops in position in opposition to the desired shelves. Then the forks extend to receive stocks 38 and after forks have retracted the accumulation conveyor 21 returns onto the rails 9 on the traverser 47 after which the traverser 47 returns to a position adjacent to the station 48.

In simultaneously carrying stocks in and out of the system, the control panel 40 in the accumulation conveyor is energized to produce a carrying-in and out information, which causes stocks to be loaded on the desired shelf and causes other stocks to be unloaded from the other desired shelf, after which the traverser returns into its original position in the same manner as in the carrying the stocks out of the system.

In changing stocks, the control panel 40 in the accumulation conveyor is energized to produce a changing information, which causes stocks 38 to be taken out of the desired shelf in the same manner as in carrying-out the stocks and the stocks 38 to be put onto the other shelf facing the same conveyor path, or another shelf facing the other conveyor path after the accumulation conveyor has been moved to the other conveyor path by the use of the traverser 47.

In the above embodiment, the rails 8 for traveling of the accumulation conveyor are fixed to the front support members 11 facing to the conveyor path. As an alternative, the rails 8 may be fixed to the connecting plate 18 by means of bolts and the like.

In carrying-out the invention, the rails 3 and 3' or the base 41 for them may be connected by connecting members to maintain them at a constant interval and further the multi-rack stacker shelves 2 may be made the same in height as the vertical frame 27 of the accumulation conveyor 21 to enable the stacker shelves to accommodate all of the stocks.

As in the above embodiment, the upper ends of the vertical members of the vertical frame 27 opposing to each other on the accumulation conveyor 21 self-upstandingly traveling between the multi-rack stacker shelves 2 are entirely opened without being connected to each other by any upper cross frame to make it possible to raise the stocks 38 to the level of the upper end of the vertical frame 27 for loading the stocks on the shelves whereby enabling the space in a building to be fully utilized. The upper end of the vertical frame 27 extends upwardly beyond the uppermost surface of the stacker shelves to enable the shelves to receive the stocks 38 thereon whereby the shelves can be lower in height and more inexpensive to manufacture than in case of accommodating stocks only within the shelves. Moreover, in the absence of an upper cross frame, the center of gravity of the accumulation conveyor is lowered to improve the stability of the system.

According to the invention the main body 4 of the traverser is made in U-shaped frame to obtain a simple but high rigidity traverser construction and the front and rear frames 6 and 7 of the traverser main body 4 are provided at their inside with the rails 9 for supporting the accumulation conveyor, permitting it to be located in a lower position by virtue of the space within the U-shaped frame to improve the stability of the traverser.

While the present invention has been shown and described in one form only, it will be obvious to those skilled in the art that it is not so limited but is susceptible of various changes and modifications without departing from the spirit and scope thereof.

What is claimed is:

1. A stacker system including a number of multi-rack stacker shelves extending in parallel with each other defining therebetween accumulation conveyor paths, comprising:
    a. an accumulation conveyor, having a lower frame; vertical frame members upstandingly affixed to said lower frame, the upper ends of said vertical frame members being opened without being connected to each other and extending upwardly beyond the uppermost surface of said stacker shelves; a carriage located between said vertical frame members for raising and lowering a load; and means to raise and lower said carriage with respect to said vertical frame members;
    b. accumulation conveyor traveling rails located on both sides of said accumulation conveyor paths;
    c. traverser traveling rails located along the ends of said stacker shelves arranged in a direction transverse to said accumulation conveyor paths;
    d. a traverser body adapted to move along said traverser traveling rails, having a generally U-shaped frame opening towards said accumulation conveyor paths;
    e. accumulation conveyor supporting rails attached to the inside of legs of the U-shaped traverser body frame, the distance between said accumulation conveyor supporting rails and the height of said rails being the same as the distance between, and the height of said accumulation conveyor traveling rails;
    f. means to move said traverser body along said traverser traveling rails; and
    g. means to move said accumulation conveyor along said accumulation conveyor supporting rails and said accumulation conveyor traveling rails.

2. A stacker system as set forth in claim 1, wherein said shelves include front support members (11) each facing the conveyor path (1) and rear support members (11') not facing the conveyor path (1), the front and rear support members (11, 11') being connected by cross beams (20) at their upper portions, each of said members being provided at their lower ends with female screw threaded fitting (12) fixed thereto, each threaded fitting threadably receiving a male thread rod (15) of height adjusting means (14) having a nut (13), the lower end (16) of the rod (15) of the height adjusting means (14) passing through an aperture in a base member; the member (17) associated with the front support member (11) being connected to the end of a connecting plate (18) made of metal band strip adjacent to the floor surface for maintaining constant the interval between the stacker shelves arranged on both sides of the conveyor path (1).

3. A stacker system as set forth in claim 1, wherein a mid portion of each vertical frame member (27) is connected to the lower frame (22) by an oblique stay member (29) having a turnbuckle (28) for adjusting the length of the member (29).

4. A stacker system as set forth in claim 3, wherein cross frame members (30) are fixed at their mid portions to the upper parts of the vertical frame members (27) at the same level as that of cross beams (20) and have apertures through their ends; spacer rods (31) formed with male screw portions (32) at their ends to extend through said aperture in said cross frame members (30) so that the ends of the cross frame members (30) and the spacer rods (31) are fixed with each other by means of nuts (33) threadedly engaged with the male screw portions (32) to ensure a constant distance between the vertical members of said vertical frame (27) to enable said carriage to pass by said vertical frame.

5. A stacker system as set forth in claim 1, wherein at the ends of said traverser traveling rails (3,3') there are provided with stations (48) as starting points for carrying in and out the stocks (38), and a conveyor (49) adjacent to each station (48) for conveying the stocks to each station (48).

6. A stacker system as set forth in claim 1, wherein the traverser body (4) is provided on both sides with roller conveyors (50) oriented parallel with said accumulation conveyor supporting rails (9).

7. A stacker system as set forth in claim 1, including a floor and a base member (17) wherein said traverser traveling rail (3) in the vicinity of the ends of said shelves is fixed on the floor by means of a base (41) which is connected to said base member (17) at the ends of said shelves (2) by connecting plates (42) of metal strip in contact with said floor, the metal strip being stiff but thin sufficient to allow a trolley to pass as its border, to the bottom surface of which plates (42) are fixed buffer plates (43) which are made of material serving to improve the stability and to prevent the slip of the connecting plates (42) on the floor to ensure a constant distance between the ends of the shelves (2) and the rail (3).

* * * * *